(12) United States Patent
Lin et al.

(10) Patent No.: US 7,923,964 B2
(45) Date of Patent: Apr. 12, 2011

(54) CHARGER INCLUDING A ROTATABLE MODULE HAVING AN OUTPUT CONNECTOR, THE MODULE PIVOTALLY DISPOSED IN A CAVITY DEFINED IN AN UPPER SURFACE OF A BASE OF THE CHARGER

(75) Inventors: Chu-Geng Lin, Tu-Cheng (TW);
Ming-Chia Chi, Tu-Cheng (TW);
Te-Hua Hsu, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 340 days.

(21) Appl. No.: 12/289,929

(22) Filed: Nov. 7, 2008

(65) Prior Publication Data

US 2010/0117598 A1    May 13, 2010

(51) Int. Cl.
*H02J 7/00* (2006.01)
(52) U.S. Cl. ....... 320/115; 320/114; 320/107; D13/107; D13/108
(58) Field of Classification Search .................. 320/107, 320/114, 115; D13/107, 108
See application file for complete search history.

(56) References Cited

U.S. PATENT DOCUMENTS

| | | | | |
|---|---|---|---|---|
| 6,926,130 B2 * | 8/2005 | Skowronski | ............. | 191/12.2 R |
| D520,013 S * | 5/2006 | Yang | ............................. | D14/434 |
| D592,132 S * | 5/2009 | Lin et al. | ...................... | D13/107 |
| D601,089 S * | 9/2009 | Lin | ............................. | D13/108 |
| D607,817 S * | 1/2010 | Tan | ............................. | D13/108 |
| 2005/0007066 A1 * | 1/2005 | Long et al. | ................... | 320/107 |
| 2006/0226805 A1 * | 10/2006 | Yu | ................................. | 320/107 |
| 2009/0051319 A1 * | 2/2009 | Fang et al. | .................... | 320/115 |

* cited by examiner

*Primary Examiner* — Edward Tso
*Assistant Examiner* — Manuel Hernandez
(74) *Attorney, Agent, or Firm* — Rosenberg, Klein & Lee (57) ABSTRACT

A charger adapted for charging a mobile phone includes a base defining a cavity and a rotatable module having a main body. The rotatable module is pivotally disposed in the cavity. The main body has a basic portion and an engaging portion which substantially perpendicularly extends from one end of the basic portion. An output connector is disposed in the engaging portion and extends out of the engaging portion towards the other end of the basic portion to define a mating direction substantially parallel with the basic portion. When the charger is in an opened state for charging, the basic portion is rotated to a predetermined place and the output connector is therefore located out of the cavity; when the mobile phone is taken away from the charger, the output connector returns into the cavity.

10 Claims, 15 Drawing Sheets

CHARGER INCLUDING A ROTATABLE MODULE HAVING AN OUTPUT CONNECTOR, THE MODULE PIVOTALLY DISPOSED IN A CAVITY DEFINED IN AN UPPER SURFACE OF A BASE OF THE CHARGER

BACKGROUND OF THE INVENTION

1. Field of the Invention

The present invention generally relates to a charger, and more particularly to a charger adapted for charging a mobile phone.

2. The Related Art

A conventional charger adapted for charging a mobile phone includes a base. An output connector is disposed in the base for mating with a charging connector of the mobile phone. A recess is formed in a surface of the base and the output connector protrudes from a bottom of the recess and extends into the recess. When the mobile phone is charged by the charger, the mobile phone is inserted into the recess and the charging connector of the mobile phone is electrically connected with the output connector of the charger for charging.

However, the charging process for the mobile phone is completed and the mobile phone is required to be taken out from the charger, as the mobile phone is held in the recess of the charger and the charger connector of the mobile phone is held by the output connector of the charger, a user is required to use one hand to hold the base of the charger and use the other hand to pull the mobile phone for taking the mobile phone out. It is not convenient for the user.

SUMMARY OF THE INVENTION

An object of the present invention is to provide a charger. The charger adapted for charging a mobile phone includes a base and a rotatable module. The base defines a cavity in an upper surface thereof. The rotatable module is pivotally disposed in the cavity of the base and has a main body. The main body has a basic portion and an engaging portion which substantially perpendicularly extends from one end of the basic portion. An output connector is disposed in the engaging portion and extends out of the engaging portion towards the other end of the basic portion opposite to the engaging portion to define a mating direction substantially parallel with the basic portion. The basic portion has a supporting surface facing the output connector. When the charger is in an opened state for charging, the basic portion of the rotatable module is rotated to be positioned at a predetermined place for supporting the mobile phone by the supporting surface and the output connector is rotated out of the cavity for mating with the mobile phone, when the mobile phone is taken out from the charger, the output connector is rotated to return into the cavity.

As described above, the rotatable module is pivotally disposed in the base, when the charger is about to charging the mobile phone, the rotatable module is rotated to make the output connector expose out of the cavity. And the mobile phone mates with the output connector and supported by the supporting surface of the basic portion and the base to be charged. When the charging process is completed, the user can hold the mobile phone and remove it along the direction away from the basic portion by only one hand. With the moving of the mobile phone, the rotatable module is rotated and the mobile phone is retained by the base, the output connector of the rotatable module is gradually disengaged with the mobile phone. So the user can take the mobile phone out of the charger by only one hand, which is convenient and easy for the user.

BRIEF DESCRIPTION OF THE DRAWINGS

The present invention will be apparent to those skilled in the art by reading the following description of embodiments thereof, with reference to the accompanying drawings, in which.

DETAILED DESCRIPTION OF THE PREFERRED EMBODIMENTS

Figure 1:
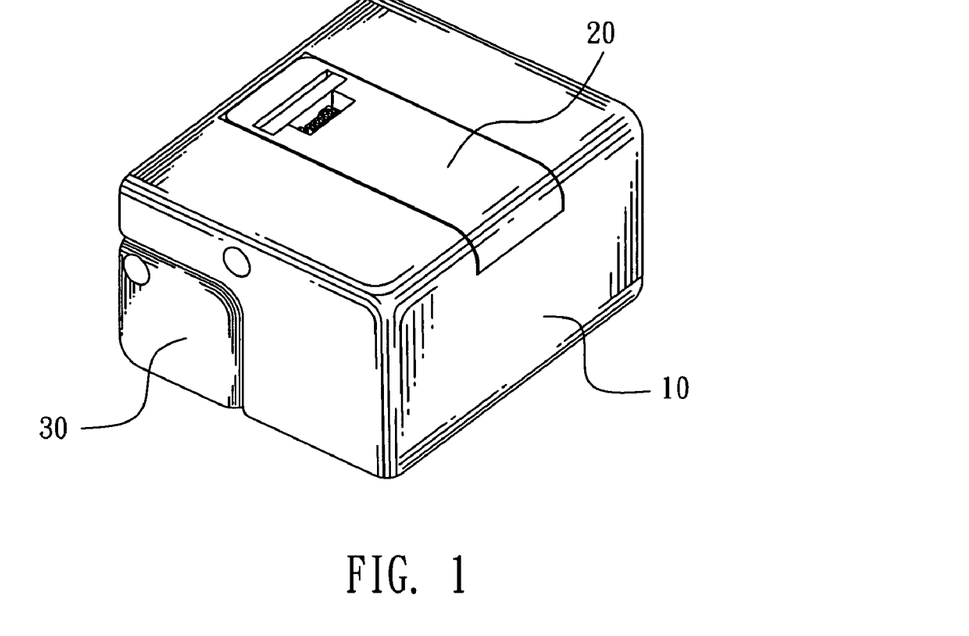
FIG. 1 is a perspective view of a first embodiment of a charger in accordance with the present invention.
Figure 2:
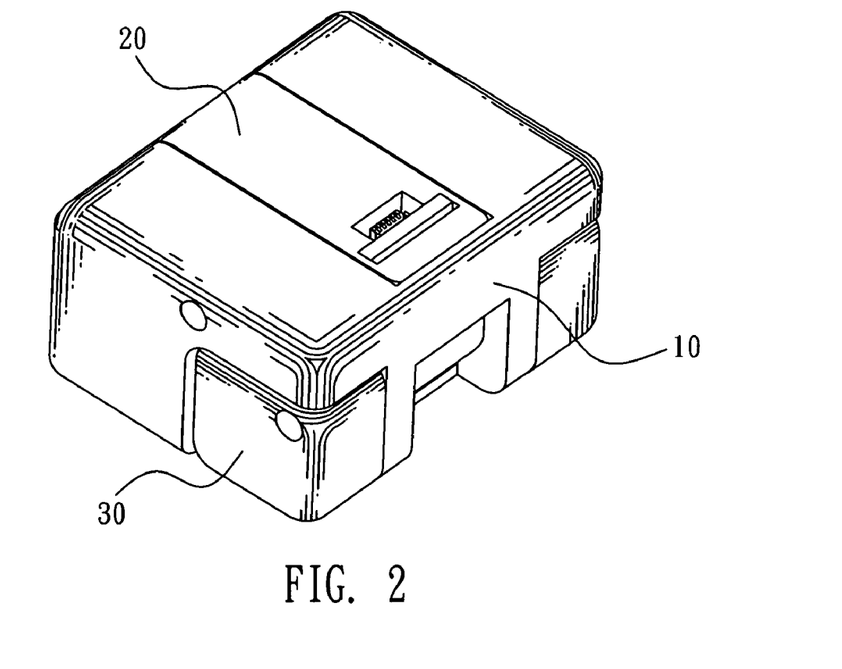
FIG. 2 is another perspective view of the charger shown in FIG. 1.

FIG. 1 and FIG. 2 illustrate a first embodiment of a charger according to the present invention. In this embodiment, the charger includes a base 10, a rotatable module 20, and two supporting elements 30.

Figure 3:
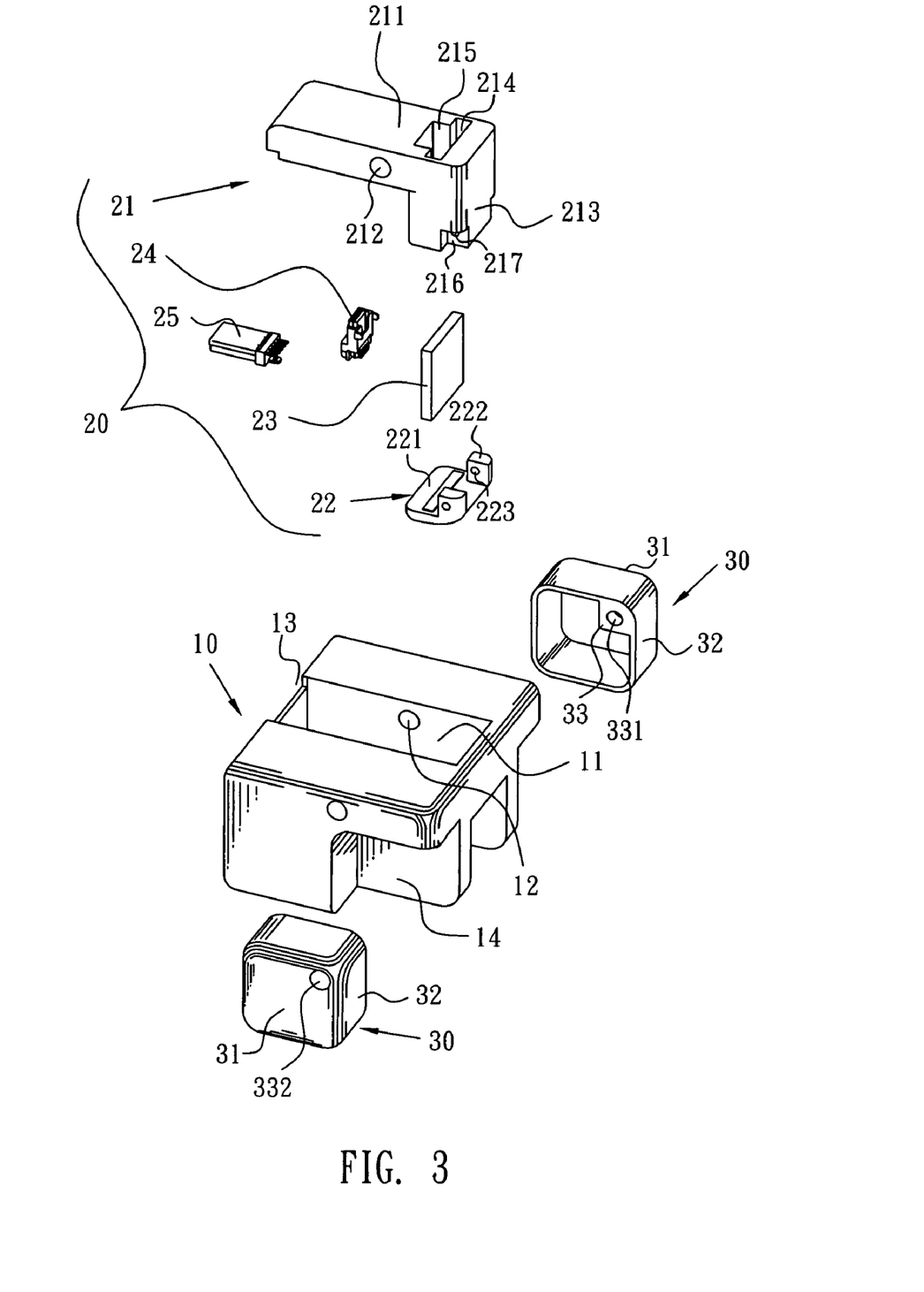
FIG. 3 is an exploded view of the charger shown in FIG. 2.
Figure 4:
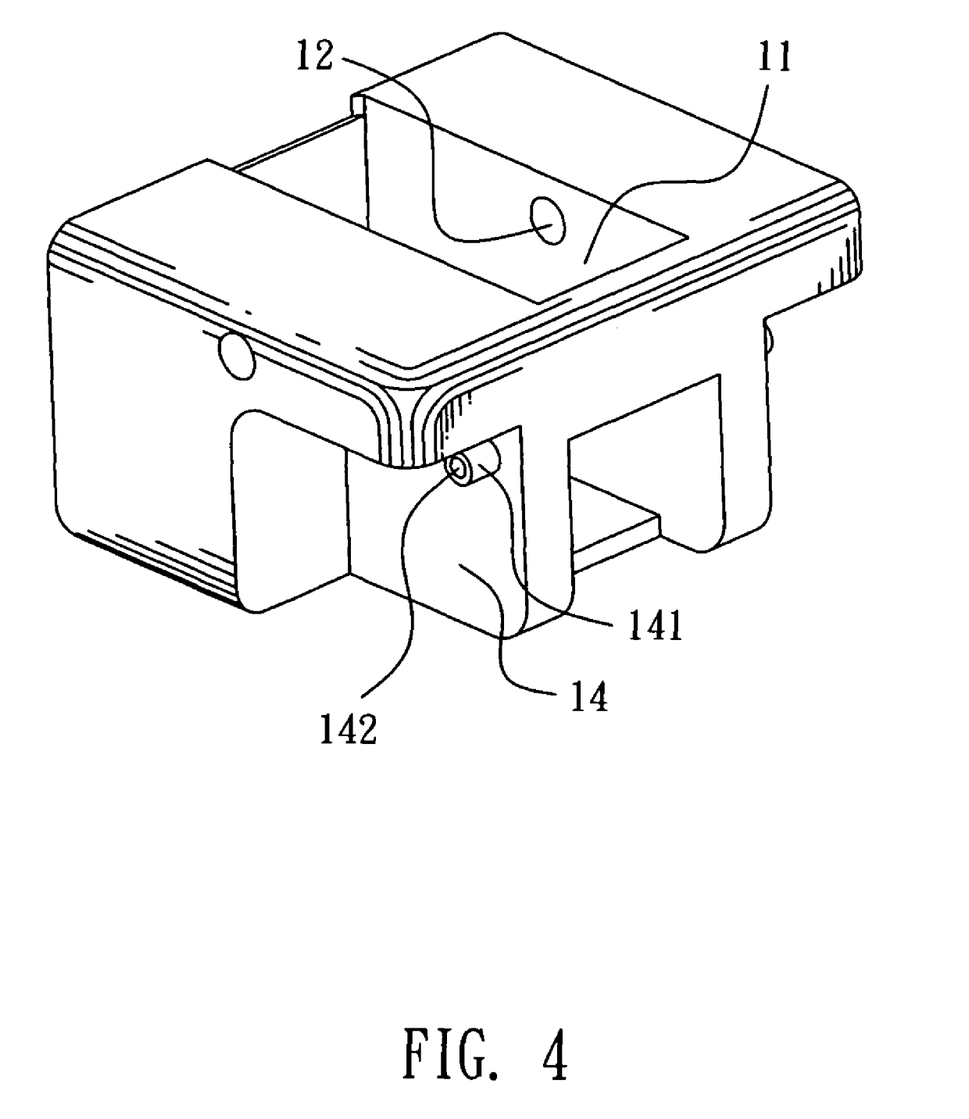
FIG. 4 is a perspective view of a base of the charger shown in FIG. 3.

Please refer to FIG. 3 and FIG. 4, the base 10 is of a substantially rectangular shape. A cavity 11 is defined in the middle of an upper surface of the base 10. Two opposite sides of the cavity 11 respectively define a first hole 12 which communicates with the cavity 11 and penetrates the outer surface of base 10. An indentation 13 is formed in a front end of the base 10 and communicates with the cavity 11. Two sides of a bottom portion of a rear end of the base 10 respectively define a rectangular accommodation space 14. A rear portion of one side of each of the accommodation spaces 14 adjacent to the cavity 11 perpendicularly protrudes into the accommodation space 14 to form a pivot 141. A first fixing hole 142 is formed in a free end of each of the pivots 141.

Please refer to FIGS. 3, 5, 6, and 7, the rotatable module 20 includes a main body 21, a cover 22, a printed circuit board 23, an input connector 24, and an output connector 25. The main body 21 has a substantially rectangular basic portion 211. A second hole 212 is formed in the basic portion 211 corresponding to the first holes 12 of the base 10 and penetrates a right side and a left side of the basic portion 211. A bottom surface of the basic portion 211 is defined as a supporting surface 2111. A rear end of the basic portion 211 perpendicularly extends downward to form a substantially rectangular engaging portion 213. A first recess 214 and a second recess 215 communicating with the first recess 214 are respectively formed in the engaging portion 213 penetrating a top surface and a bottom surface thereof. A lower portion of the second recess 215 penetrates a front side of the engaging portion 213. Two ends of a bottom surface of the engaging portion 213 respectively define a receiving portion 216. One side of each of the receiving portion 216 defines a first aperture 217.

Figure 5:
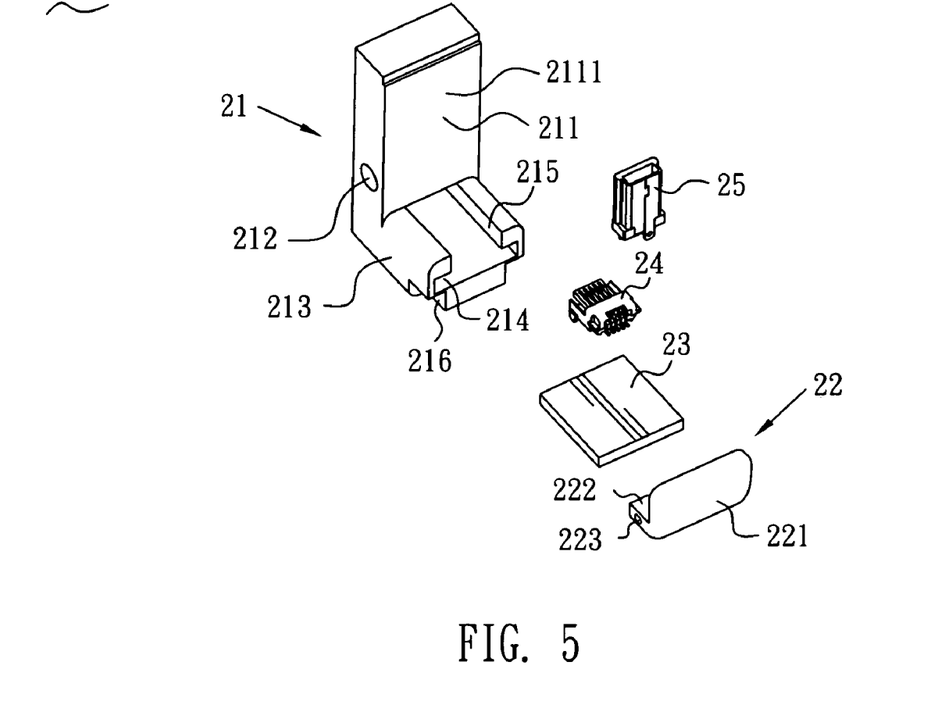
FIG. 5 is an exploded view of a rotatable module of the charger shown in FIG. 3.
Figure 6:
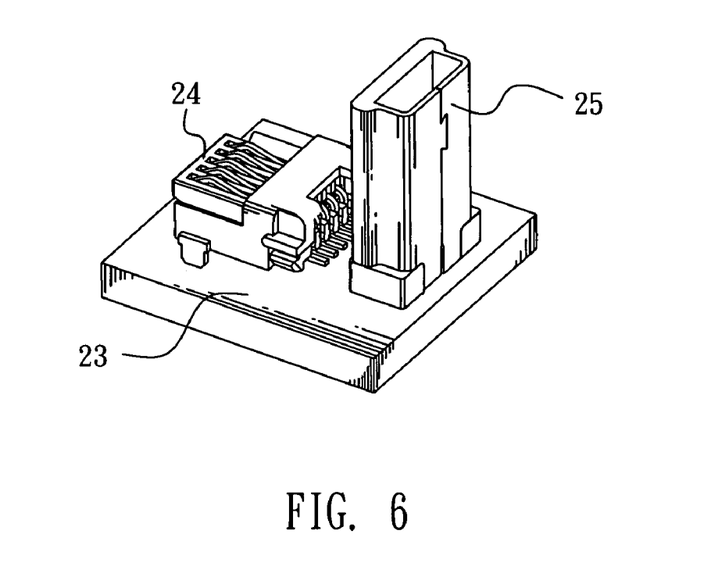
FIG. 6 is a perspective view of a combination of a printed circuit board, an input connector and an output connector which are shown in FIG. 3.

The input connector 24 and the output connector 25 are respectively fixed on the printed circuit board 23. The input connector 24 is disposed parallel to the printed circuit board 23 and the output connector 25 is disposed perpendicular to the printed circuit board 23. The printed circuit board 23 is slidably disposed in the first recess 214 to make the input connector 24 and the output connector 25 be disposed in the second recess 215 and the output connector 25 perpendicularly extend out of the second recess 215.

The cover 22 has a substantially rectangular holding board 221. Two ends of a rear end of the holding board 221 respectively perpendicularly extend upward to form a lump 222. A second aperture 223 is formed in each of the lump 222 corresponding to the first aperture 217. The lumps 222 are respectively inserted into the receiving portions 216 and a screw (not shown) is inserted into the second aperture 223 and the corresponding first aperture 217 to fix the cover 22 on the bottom of the engaging portion 213. The cover 22 covers the bottom of the engaging portion 213 to prevent the printed circuit board 23 and the output connector 25 from falling out of the engaging portion 213.

Please refer to FIG. 3 again, each of the supporting elements 30 has a rectangular basic board 31. Each side of the basic board 31 perpendicularly extends to form a sideboard 32. A corner of the basic board 31 is protruded upward to form a bump 33 connected with two adjacent sideboards 32. An axial hole 331 is formed in the bump 33 and a second fixing hole 332 is formed in the basic board 31 communicating with the axial hole 331.

Figure 7:
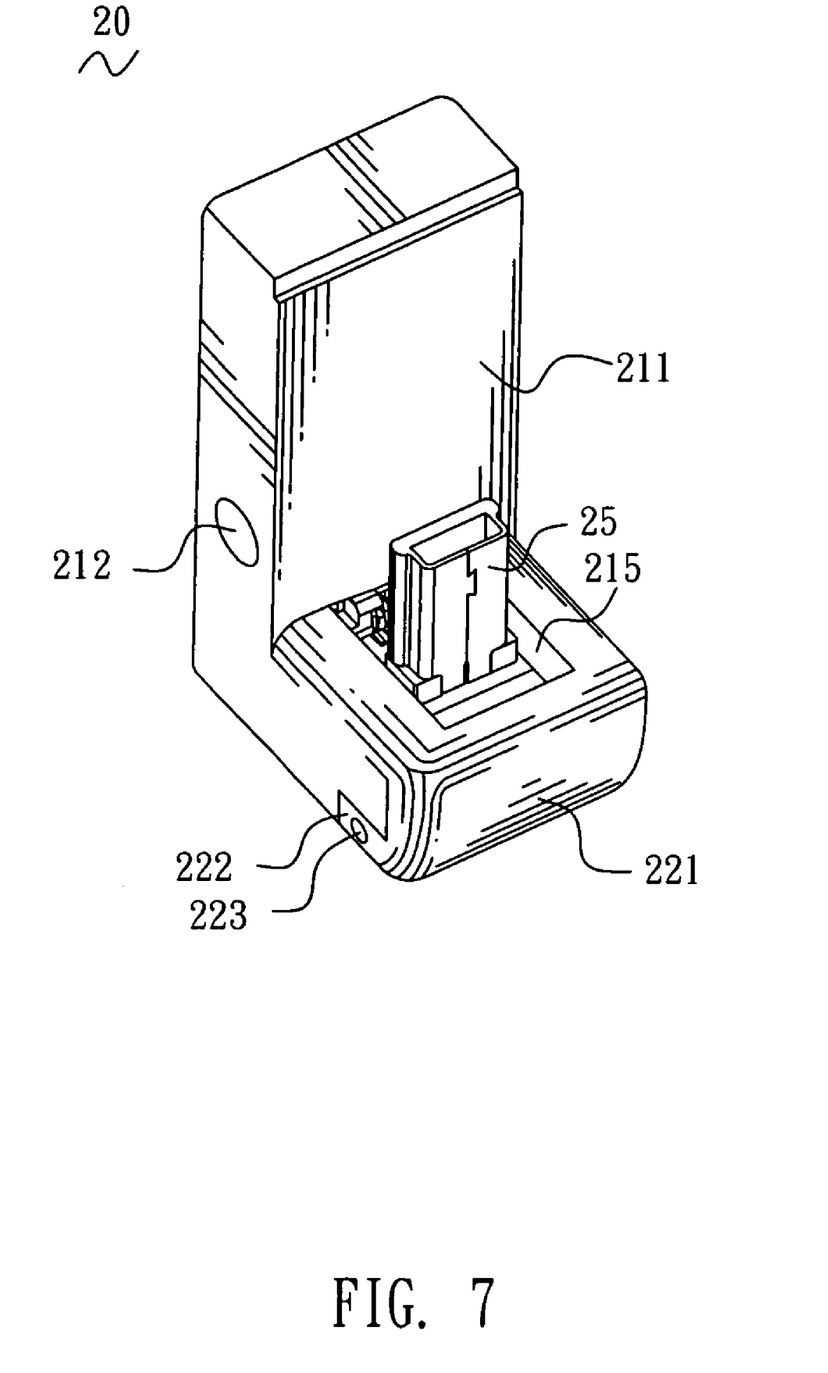
FIG. 7 is a perspective view of the rotatable module of the charger shown in FIG. 3.
Figure 8:
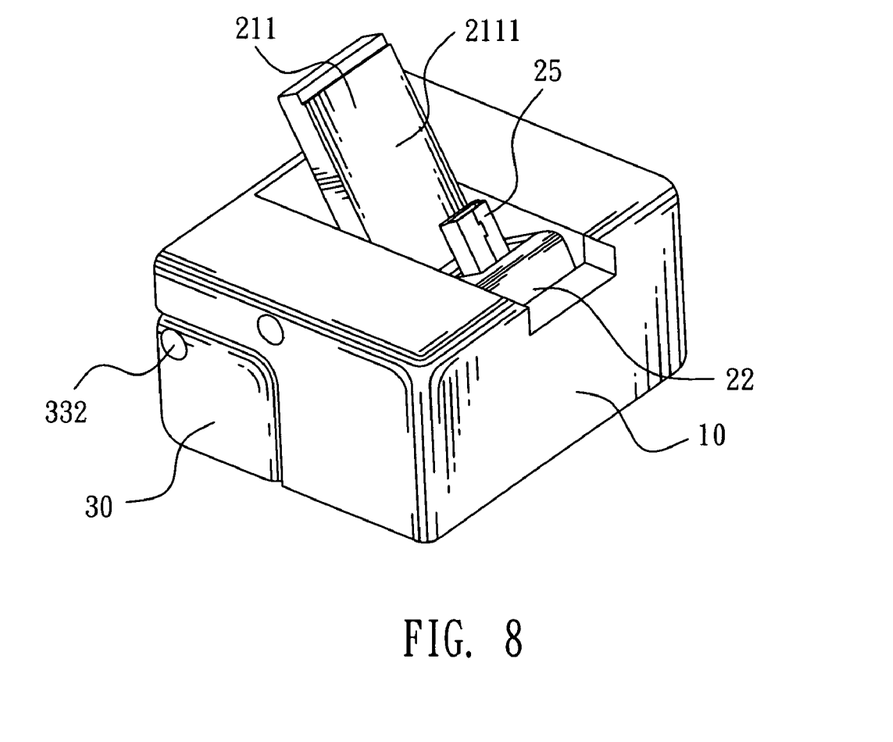
FIG. 8 is a perspective view of the charger shown in FIG. 1 which is in an opened state.
Figure 9:
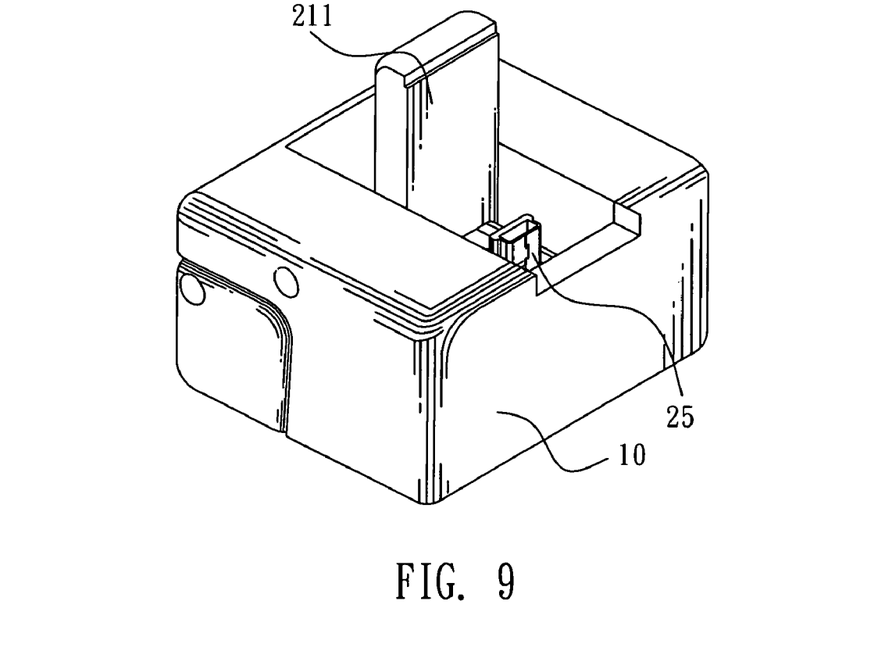
FIG. 9 is a perspective view of the charger shown in FIG. 8 when the charger is in a disengaged state with respect to a mobile phone.

Please refer to FIGS. 3, 4, and 7, in assembly, the second hole 212 of the rotatable module 20 is disposed corresponding to the first hole 12 of the base 10 and a pivotal rod (not shown) is inserted into the first hole 12 and the second hole 212 to make the rotate module 20 be pivotally received in the cavity 11 of the base 10. The front end of the basic portion 211 of the main body 21 of the rotatable module 20 is received in the indentation 13 of the base 10 to make the basic portion 211 cover the cavity 11 and the engaging portion 213 be closed in the cavity 11. In this case, the charger is in a closed state. The two supporting elements 30 are respectively received in the two accommodation spaces 14 of the base 10. More especially, the pivot 141 of the base 10 is inserted into the axial hole 331 of the supporting element 30. A fixing rod (not shown) is inserted into the second fixing hole 332 and the first fixing hole 142, one end of which is fixed in the first fixing hole 142 and the other end of which is fastened on the basic board 31 of the supporting element 30 to prevent the supporting element 30 from dropping out of the base 10.

Please refer to FIGS. 8, 9, 10, and 11, when the charger described above is adapted for charging a mobile phone (not shown), a user lifts the basic portion 211 of the rotatable module 20 upward to make the front end of the basic portion 211 apart from the indentation 13 and the engaging portion 213 and the cover 22 rotate upward around the pivotal rod until the cover 22 is restricted by the front side of the cavity 11 or the basic portion 211 is restricted by the rear side of the cavity 11. In this case, the charger is in an opened state. In this embodiment, when the charger is in the opened state, the cover 22 is restricted by the front side of the cavity 11. If a charging connector of the mobile phone is disposed in a lateral side thereof, then the mobile phone will be transversely placed on the charger to make the charging connector of the mobile phone be inserted into the output connector 25 of the rotatable module 20. One surface of the mobile phone is supported by the supporting surface 2111 of the basic portion 211 of the rotatable 20. The junction of the lateral side and the surface is supported by an upper surface of the base 10. When the charging process is completed and the mobile phone is required to be taken out from the charger, the user can hold the mobile phone and take it forward by only one hand. With the moving of the mobile phone, the engaging portion 213 and the cover 22 of the rotatable module 20 rotate downward around the pivotal rod which makes the output connector 25 gradually separate from the mobile phone. When the basic portion 211 of the rotatable module 20 is substantially perpendicular to the upper surface of the base 10, the mobile phone is restricted by the upper surface of the base 10 and the output connector 25 is separated from the mobile phone completely. So the mobile phone will be taken out from the charger easily.

Figure 10:
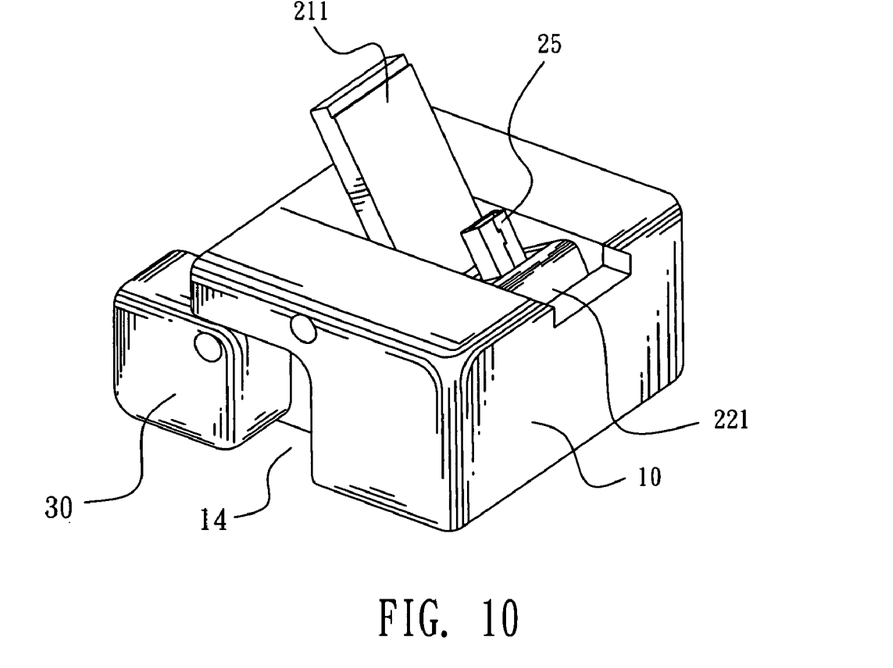
FIG. 10 is a perspective view of the charger shown in FIG. 3 in an opened state when two supporting elements are rotated out of the base.
Figure 11:
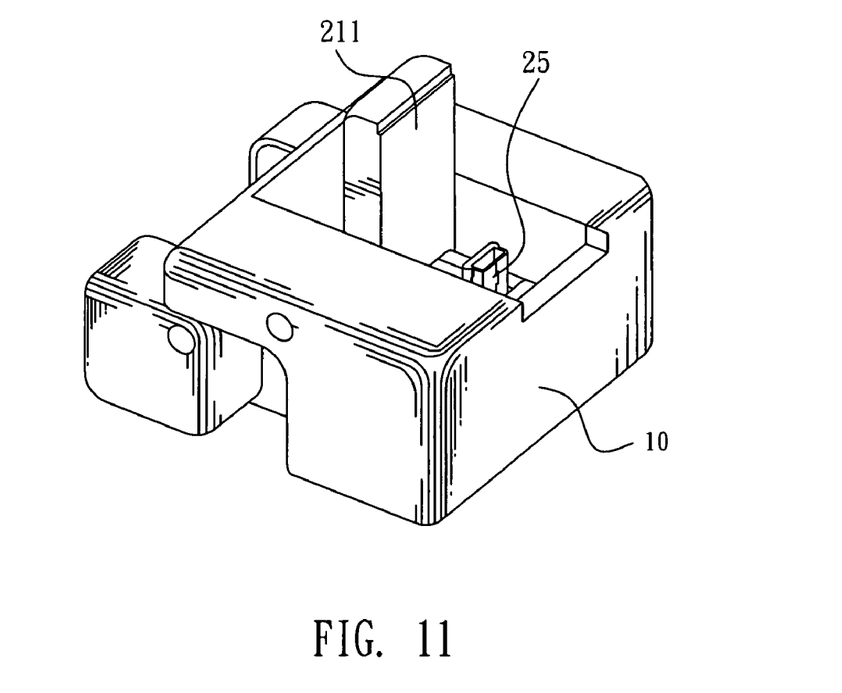
FIG. 11 is a perspective view of the charger shown in FIG. 10 when the charger is in a disengaged state with the mobile phone.

If the charging connector of the mobile phone is disposed in a tail thereof, then the mobile phone will be erectly placed on the charger. In order to prevent the mobile phone toppling down, the supporting elements 30 have to rotate around the fixing rod to be out of the accommodation spaces 14. The charging connector of the mobile phone is inserted into the output connector 25 of the rotatable module 20. One surface of the mobile phone is supported by the supporting surface 2111 of the basic portion 211 of the rotatable 20. The junction of the tail and the surface is supported by the upper surface of the base 10. When the charging process is completed and the mobile phone is required to be taken out from the charger, the user can hold the mobile phone and take it out from the charger by only one hand. The supporting elements 30 are received in the accommodation spaces 14 when the charger is not in use, which reduces the space of the charger for the convenience of carrying in travel. When the supporting elements are rotated out of the accommodation spaces 14, the hold of the charger is changed outward to prevent the mobile phone and the charger toppling down together.

The output connector 25 and the printed circuit board 23 fixed together with the output connector 25 can respectively slide in the second recess 215 and the first recess 214 while the user pushes or pulls the output connector 25. So the user can push or pull the output connector 25 to adjust the distance between the output connector 25 and the supporting surface 2111 of the basic portion 211 of the main body 21 to adapt for charging the mobile phone with different depth.

Figure 12:
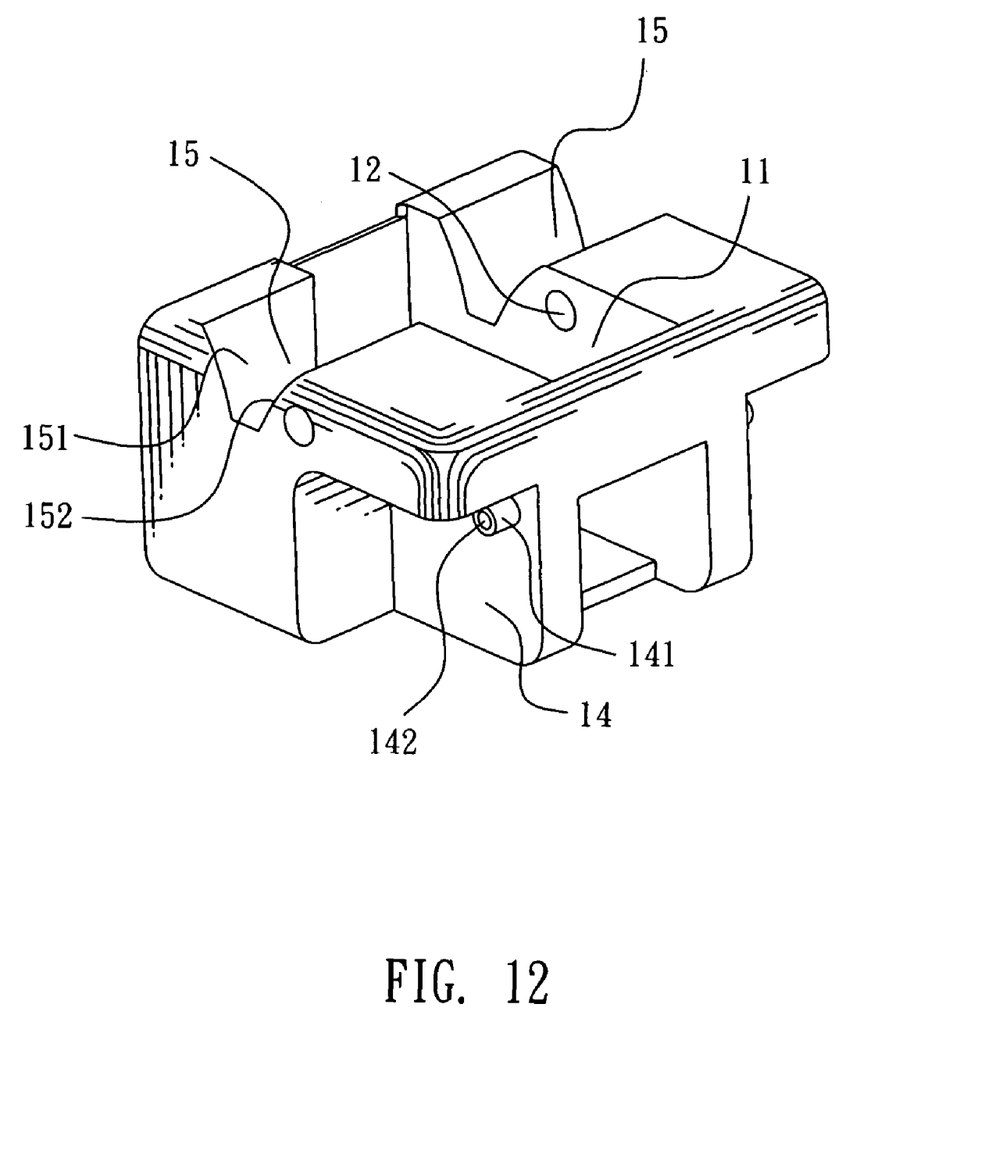
FIG. 12 is a perspective view of the base of a second embodiment of the charger according to the present invention.

Please refer to FIG. 12, a second embodiment of the charger according to the present invention is shown. The second embodiment is similar to the first embodiment. The upper surface of the base 10 defines a supporting groove 15 which is disposed at two sides of the cavity 11 across the cavity 11. The supporting groove 15 includes a first ramp 151 inclining forward from bottom to top and a second ramp 152 inclining rearward from bottom to top.

When the charger according to the this embodiment is adapted for charging the mobile phone, if the charging connector of the mobile phone is disposed in a lateral side thereof, then the mobile phone will be transversely placed on the charger to make the charging connector of the mobile phone be inserted into the output connector 25 of the rotatable module 20. The lateral side having the charging connector is supported by the first ramp 151; one surface of the mobile phone is supported by the supporting surface 2111 of the basic portion 211 of the rotatable 20 and the second ramp 152; the junction of the lateral side and the surface is supported by a bottom surface of the supporting groove 15, which makes the mobile phone be placed in the charger steadily. When the charging process is completed and the mobile phone is required to be taken out from the charger, the user can hold the mobile phone and take it forward by only one hand. The mobile phone can move forward along the first ramp 151. With the moving of the mobile phone, the engaging portion 213 and the cover 22 of the rotatable module 20 rotate downward around the pivotal rod which makes the output connector 25 be gradually separated from the mobile phone. When the basic portion 211 of the rotatable module 20 is substantially perpendicular to the upper surface of the base 10, the mobile phone is restricted by the upper surface of the base 10 and the output connector 25 is separated from the mobile phone perfectly. So the mobile phone will be taken out from the charger easily.

If the charging connector of the mobile phone is disposed in the tail thereof, then the mobile phone will be erectly placed on the charger. One surface of the mobile phone is supported by the supporting surface 2111 of the basic portion 211 of the rotatable 20 and the second ramp 152. The junction of the tail and the surface is supported by the bottom of the supporting groove 15.

Figure 13:
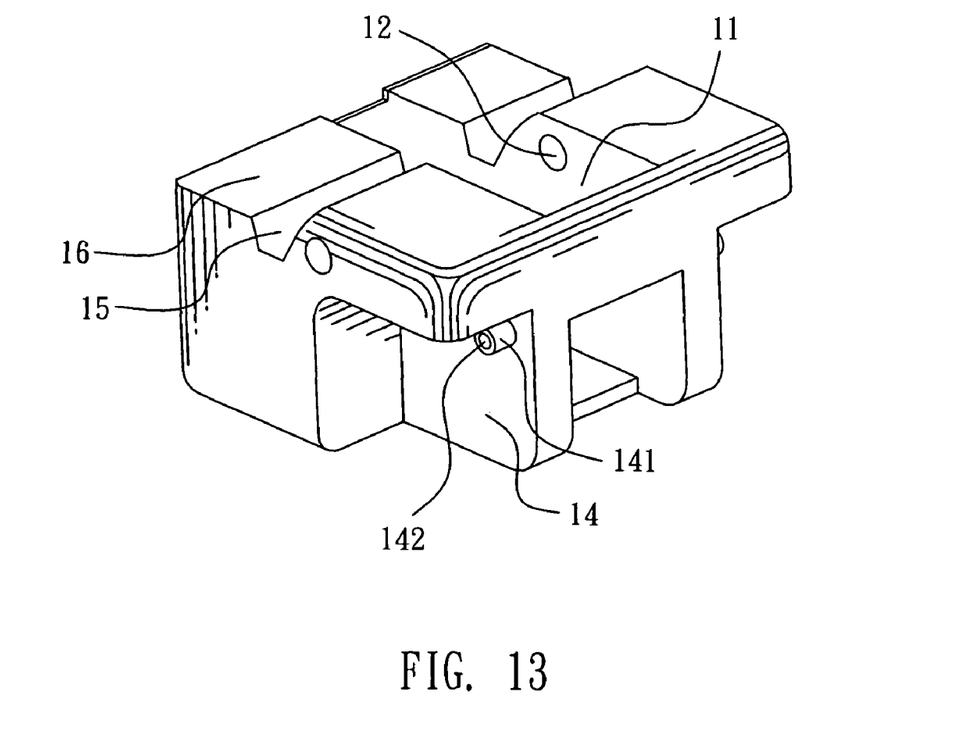
FIG. 13 is a perspective view of the base of a third embodiment of the charger according to the present invention.
Figure 14:
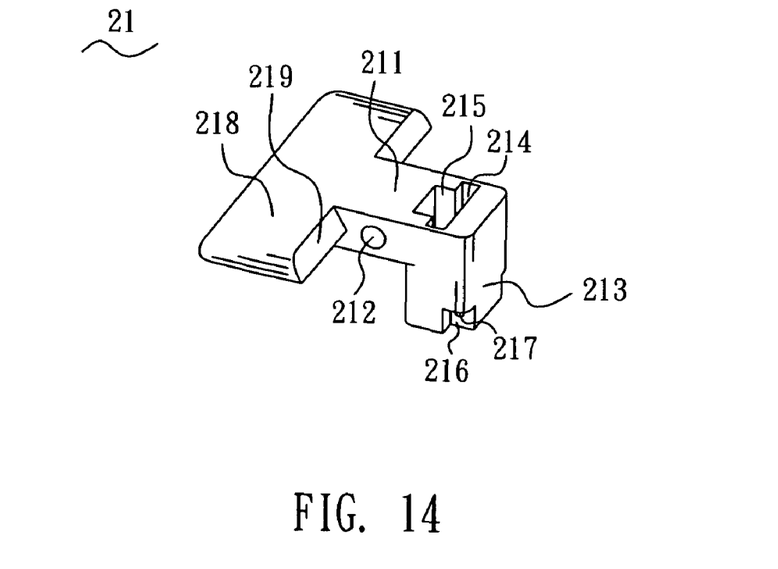
FIG. 14 is a perspective view of a main body of the rotatable module of a third embodiment of the charger according to the present invention.

Please refer to FIG. 13 and FIG. 14, a third embodiment of the charger according to the present invention is shown. This embodiment is similar to the second embodiment described above. The upper surface of the base 10 between the front end and the supporting groove 15 is horizontally cut a part to form a section 16 which is disposed lower than the upper surface of the base 10. Two sides of a front end of the main body 21 of the rotatable module 20 extend outward to form a retaining portion 218. A rear side of the retaining portion 218 is a ramp named retaining ramp 219 which inclines forward from top to bottom. When the charger according to this embodiment is in assembly, the retaining portion 218 is placed on the section 16. When the charger is opened, the retaining ramp 219 is supported by the upper surface of the base 10 to ensure the mobile phone is placed on the rotatable module 20 steadily.

With reference to FIG. 15-18, a fourth embodiment of the charger according to the present invention is shown. This embodiment is similar to the third embodiment described above. The upper surface of the base 10 defines a sliding groove 17 extending along a direction parallel to the supporting groove 15 and passes through two opposite outer sides of the base 10. The sliding groove 17 both communicates with the cavity 11 and the supporting groove 15 and the depth of the sliding groove 17 is substantially equal to that of the cavity 11. Two ends of a bottom surface of the sliding groove 17 respectively protrude upward to form a block 171. Two opposite sidewalls of the sliding groove 17 respectively define a sliding track 172 extending along the direction as the same as the extended direction of the sliding groove 17.

Please refer to FIG. 16 again, two sliding elements 40 are slidably received in the sliding groove 17. Each of the sliding elements 40 has a rectangular bottom board 41. An outer board 42 and an inner board 43 respectively perpendicularly extend upward from two opposite sides of the bottom board 41. A sliding slot 411 is defined in the bottom board 41 which penetrates the bottom board 41 and extends to the outer board 42. A free end of the inner board 43 obliquely extends upward to form a first connecting board 44. The middle of an inner side of the outer board 42 horizontally extends toward the first connecting board 44 to form a sliding board 45 which connects an upper end of the first connecting board 44. An upper end of the outer board 42 horizontally extends towards the inner board 43 to form a top board 46. An upper surface of the top board is defined as a top surface 461 and a front end and a rear end of the top surface 461 are respectively inclined downward to form a supporting ramp 462. A second connecting board 47 is formed to connect the inner board 43, the first connecting board 44 and the top board 46.

Figure 16:
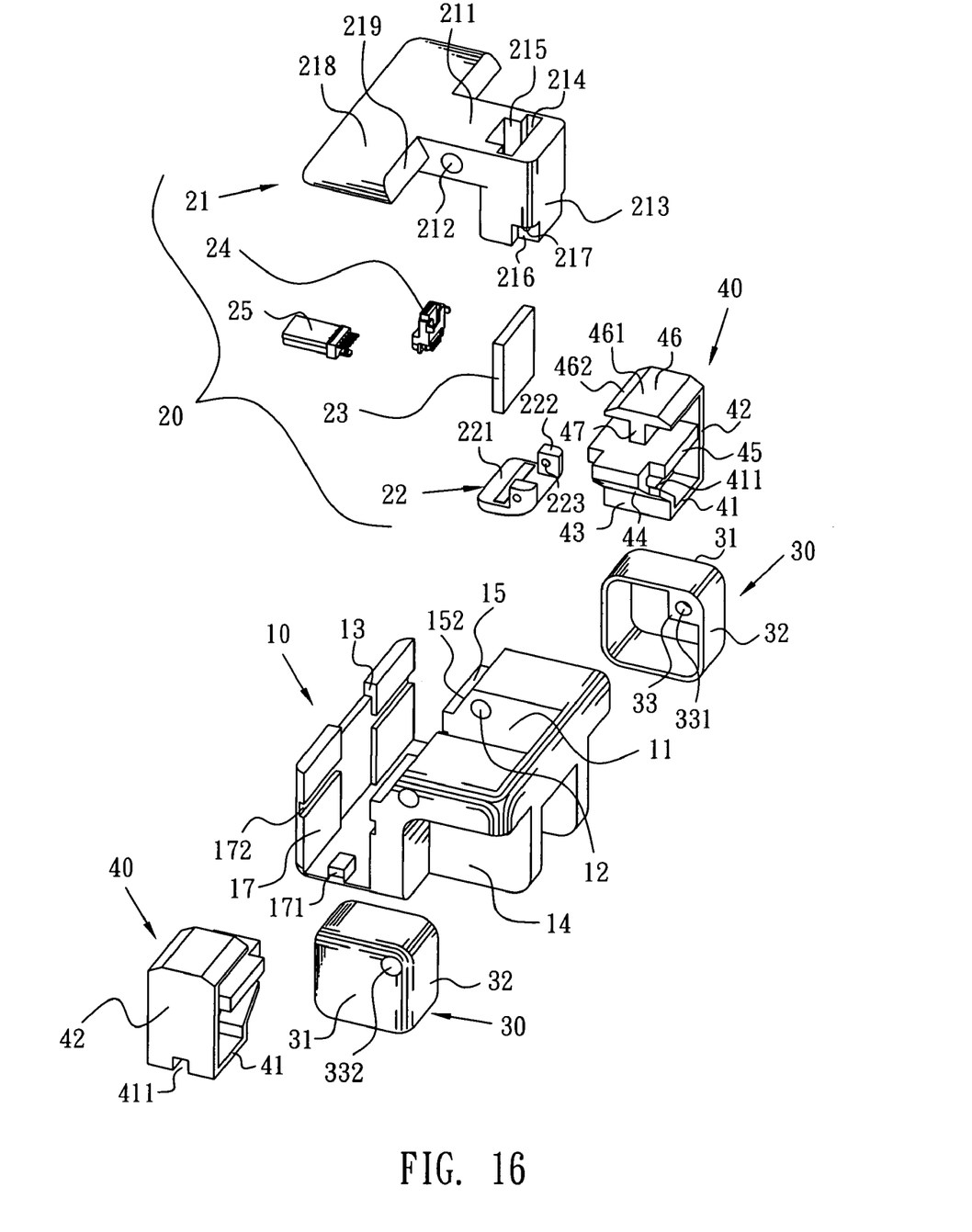
FIG. 16 is an exploded view of the charger shown in FIG. 15.
Figure 17:
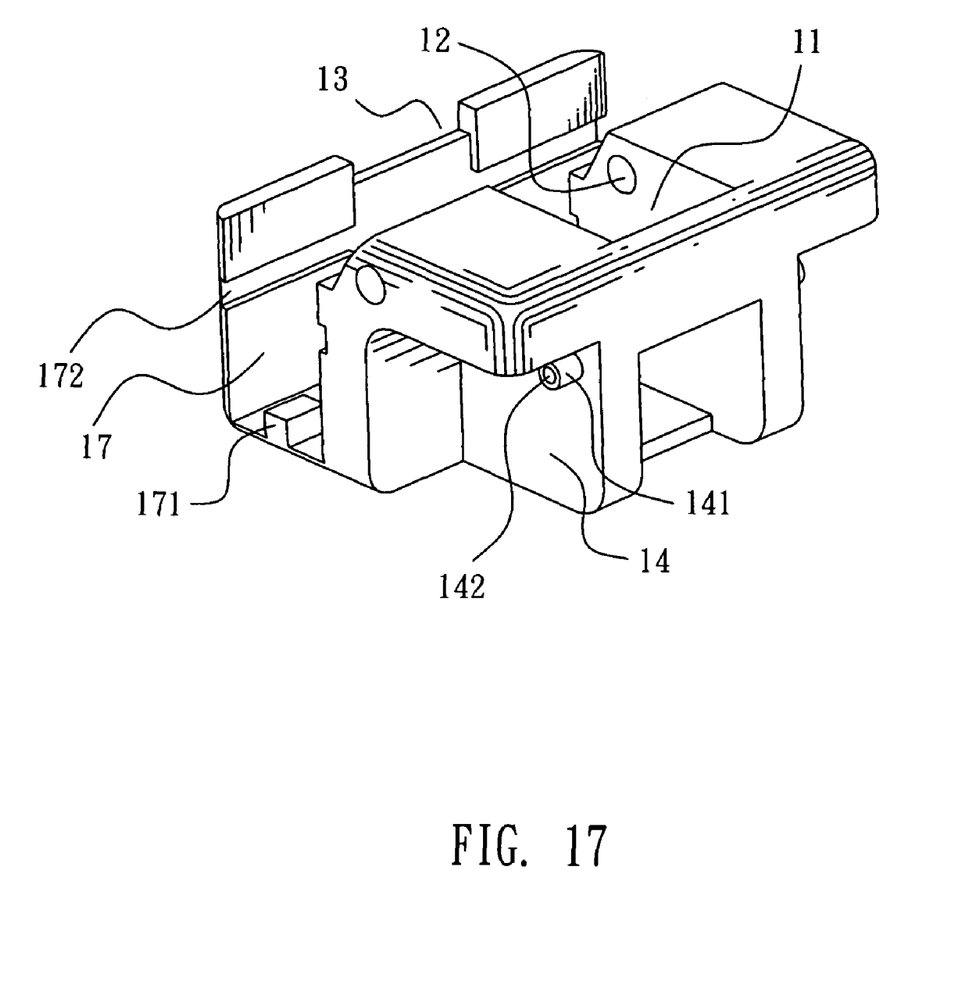
FIG. 17 is a perspective view of the base of the charger shown in FIG. 16.
Figure 18:
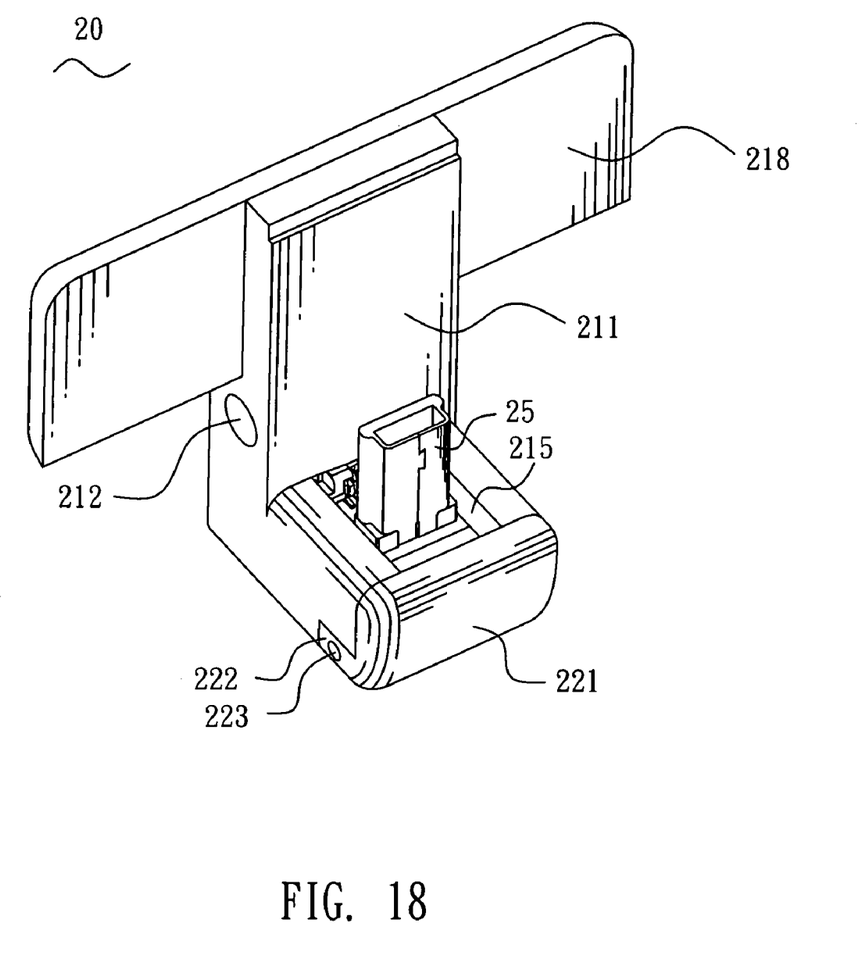
FIG. 18 is a perspective view of the rotatable module shown in FIG. 15.
Figure 19:
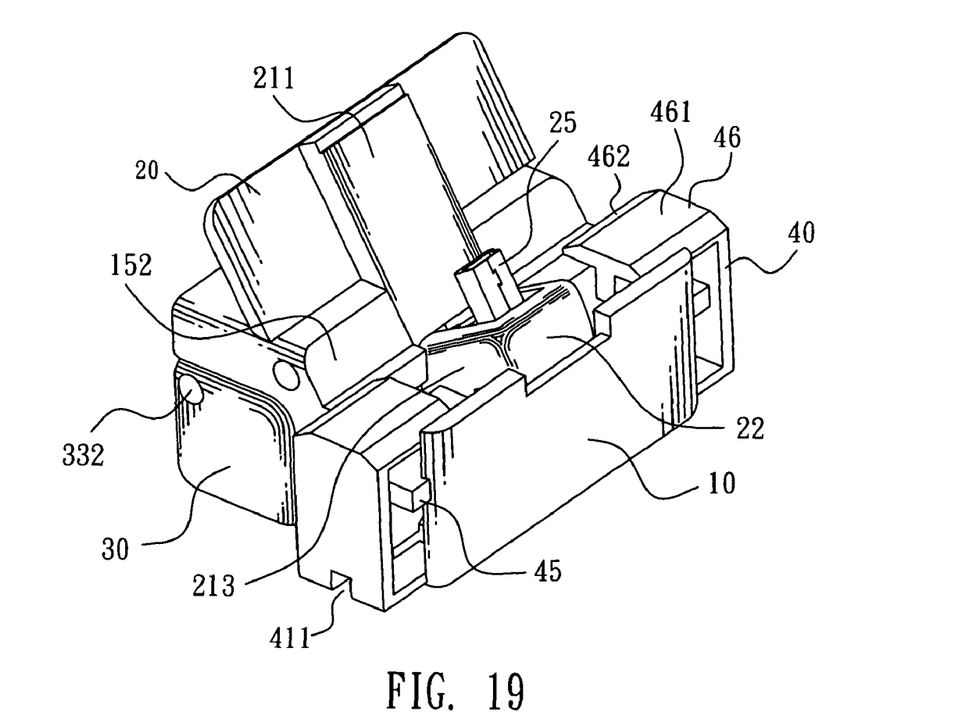
FIG. 19 is a perspective view of the charger shown in FIG. 15 which is in an opened state.
Figure 20:
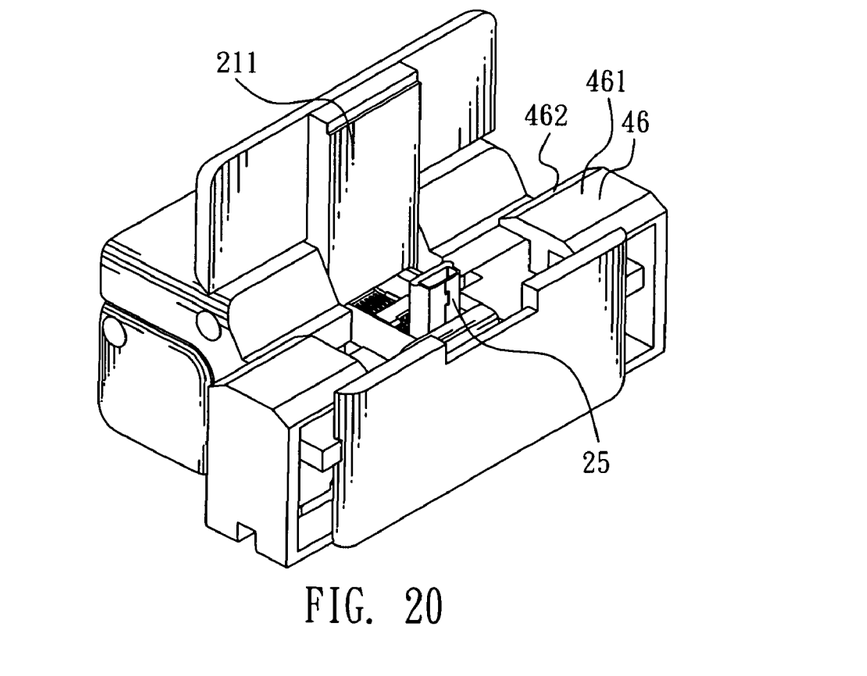
FIG. 20 is a perspective view of the charger shown in FIG. 19 when the charger is in a disengaged state with respect to the mobile phone.

When the charger according to this embodiment is in assembly, the sliding elements 40 are slidably received in the sliding groove 17 of the base 10. More especially, two opposite outer sides of the sliding board 45 are respectively received in the respective sliding track 172, the sliding slot 411 engages with the block 171 of the base 10. Then the retaining portion 218 covers the top board 46.

Please refer to FIG. 19-22, when the charger described above is adapted for charging the mobile phone, the user lifts the basic portion 211 of the rotatable module 20 upward to make the front end of the basic portion 211 apart from the indentation 13 and the engaging portion 213 and the cover 22 rotate upward around the pivotal rod. At the same time, the sliding elements 40 slide outward along the sliding track 172 until the rotatable module 20 is fully opened. The retaining ramp 219 of the retaining portion 218 is supported by the upper surface of the base 10. If a charging connector of the mobile phone is disposed in a lateral side thereof, then the mobile phone will be transversely placed on the charger to make the charging connector of the mobile phone be inserted into the output connector 25 of the rotatable module 20. The lateral side with the charging connector is supported by the supporting ramp 462 of the sliding element 40. One surface of the mobile phone is supported by the supporting surface 2111 of the basic portion 211 of the rotatable module 20 and the second ramp 152 of the base 10. The junction of the lateral side and the surface is supported by the bottom surface of the supporting groove 15. When the charging process is completed and the mobile phone is required to be taken out from the charger, the user can hold the mobile phone and take it forward by only one hand. The mobile phone can move forward along the supporting ramp 462. With the moving of the mobile phone, the engaging portion 213 and the cover 22 of the rotatable module 20 rotate downward around the pivotal rod which makes the output connector 25 gradually separate from the mobile phone. When the basic portion 211 of the rotatable module 20 is substantially perpendicular to the upper surface of the base 10, the mobile phone is restricted by the top surface 461 and the output connector 25 is separated from the mobile phone completely. So the mobile phone can be taken out from the charger easily.

Figure 21:
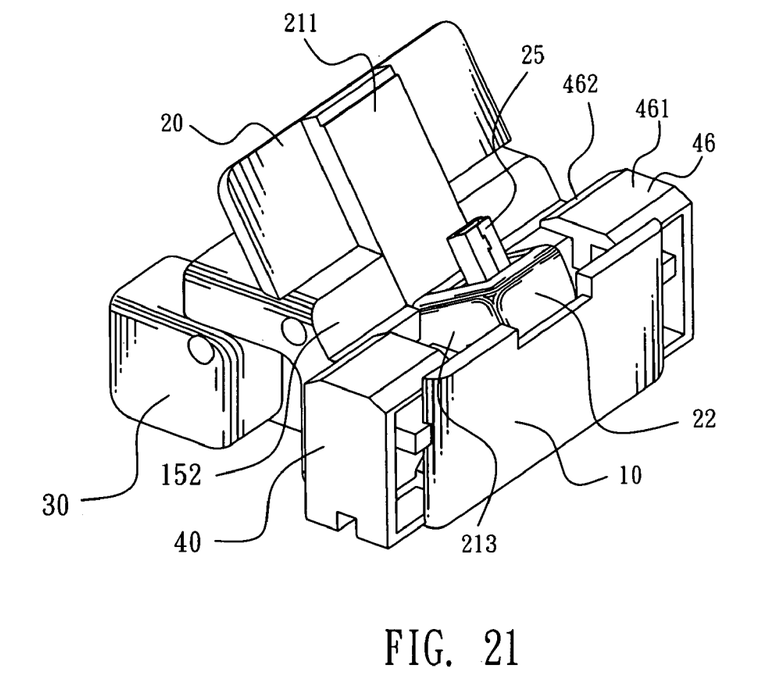
FIG. 21 is a perspective view of the charger shown in FIG. 15 in an opened state when the two supporting elements are rotated out of the base.
Figure 22:
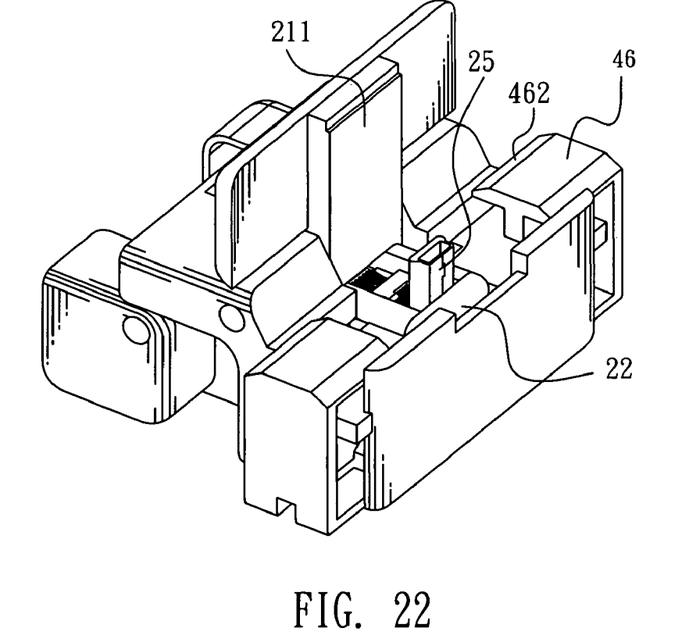
FIG. 22 is a perspective view of the charger shown in FIG. 21 when the charger is in a disengaged state with respect to the mobile phone.

If the charging connector of the mobile phone is disposed in the tail thereof, then the mobile phone will be erectly placed on the charger. The tail of the mobile phone is supported by the supporting ramp 462. One surface of the mobile phone is supported by the supporting surface 2111 of the basic portion 211 of the rotatable module 20 and the second ramp 152. The junction of the tail and the surface is supported by the bottom surface of the supporting groove 15. The charging connector of the mobile phone is inserted into the output connector 25 of the rotatable module 20. When the charging process is completed and the mobile phone is required to be taken out from the charger, the user can hold the mobile phone and take it out from the charger by only one hand.

Figure 15:
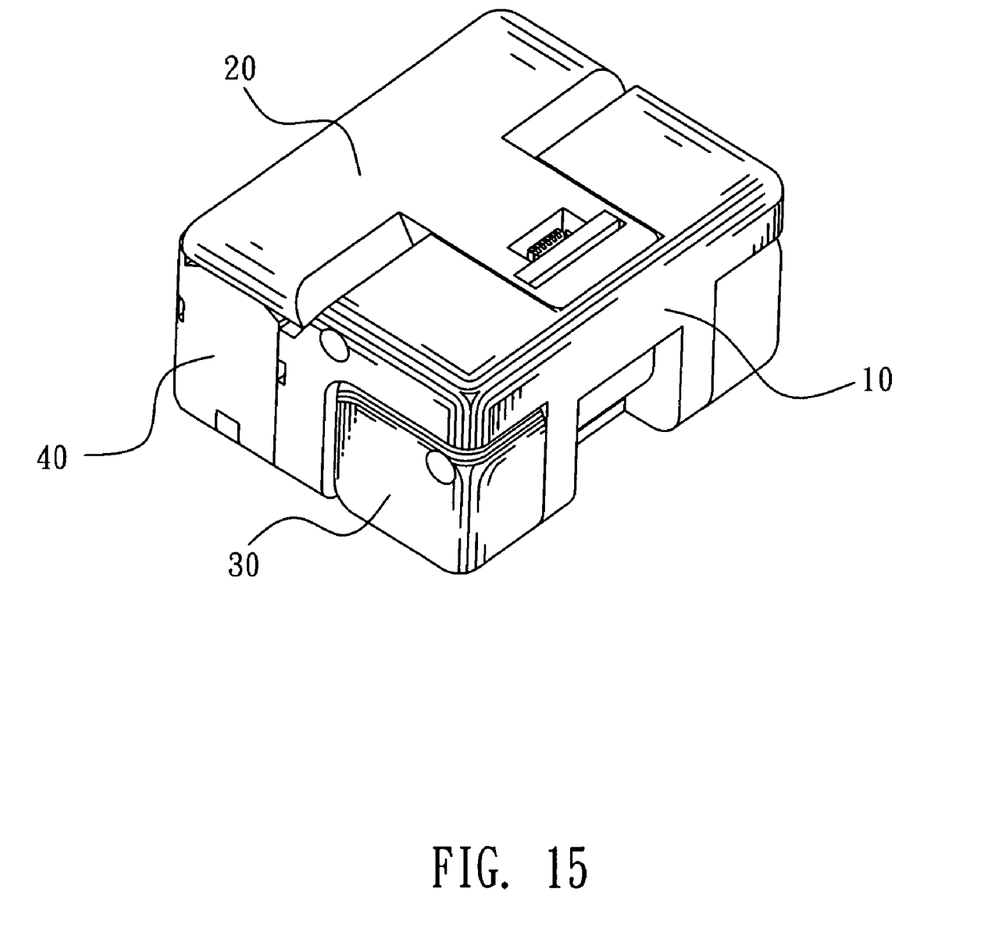
FIG. 15 is a perspective view of a fourth embodiment of the charger according to the present invention.

The sliding elements 40 can be received in the sliding groove 17 when the charger is not in use, which reduces the size of the charger for the convenient to carry in travel. The sliding elements 40 can slide outward from the base 10 when the charger is in use, which changes the hold of the charger outward to prevent the charger and the mobile phone from toppling down.

As described above, the rotatable module 20 is pivotally disposed in the base 10, when the charger is about to charging the mobile phone, the rotatable module 20 is rotated upward to make the output connector 25 expose out of the cavity 11. The rotation is stopped and the charger is fully opened until the basic portion 211 of the rotatable module 20 is restricted by the base 10. And then the mobile phone mates with the output connector 25 and is supported by the supporting surface 2111 of the basic portion 211 and the base 10 to be charged. When the charging process is completed, the user can hold the mobile phone and take it forward by only one hand. With the moving of the mobile phone, the rotatable module 20 is rotated downward and the mobile phone is retained by the base 10, the output connector 25 of the rotatable module 20 is gradually disengaged with the mobile phone. So the user can take the mobile phone out of the charger by only one hand, which is convenient and easy for the user.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A charger adapted for charging a mobile phone, comprising:
   a base defining a cavity in an upper surface thereof; and
   a rotatable module pivotally disposed in the cavity of the base and having a main body, the main body having a basic portion and an engaging portion substantially perpendicularly extending from one end of the basic portion, an output connector being disposed in the engaging portion and extending out of the engaging portion and towards the other end of the basic portion opposite to the engaging portion to define a mating direction substantially parallel with the basic portion, the basic portion having a supporting surface facing the output connector;
   wherein when the charger is in an opened state for charging, the basic portion of the rotatable module is rotated to a predetermined location for supporting the mobile phone by the supporting surface and therefore the output connector is out of the cavity for mating with the mobile phone, and when the mobile phone is taken away from the charger, the output connector returns into the cavity.

2. The charger as claimed in claim 1, wherein two opposite sides of the base respectively defines a first hole in a line to communicate the cavity, the basic portion of the main body defines a second hole in a portion corresponding to the first hole, and a pivotal rod passes through the first holes and the second hole to make the main body be pivotally received in the cavity of the base.

3. The charger as claimed in claim 1, wherein the rotatable module further comprises a printed circuit board and an input connector, the input connector and the output connector are mounted on the printed circuit board, the combination of the input connector, the output connector and the printed circuit board is disposed in the engaging portion.

4. The charger as claimed in claim 3, wherein the engaging portion defines a recess passing therethrough along the extended direction of the engaging portion, the combination of the input connector, the output connector and the printed circuit board is slidably received in the recess and the output connector perpendicularly extends out of the recess to be parallel to the basic portion.

5. The charger as claimed in claim 4, wherein the rotatable module further comprises a cover covering the recess at an end away from the main body for preventing the combination of the input connector, the output connector and the printed circuit board falling out from the recess.

6. The charger as claimed in claim 1, wherein the upper surface of the base at two sides of the cavity is depressed to form a supporting groove which is disposed across the cavity and has at least one ramp to assist the supporting surface of basic portion for supporting the mobile phone.

7. The charger as claimed in claim 1, further comprising two supporting elements respectively rotatably received in two accommodation spaces which are symmetrically formed in an end of the base and spaced away from each other, the supporting elements capable of rotating out from the accommodation spaces for preventing the charger from toppling down.

8. The charger as claimed in claim 1, further comprising two sliding elements slidably received in a sliding groove which is formed in the end of the base and passes therethrough along the direction perpendicular to the cavity, the sliding elements capable of sliding out of base along the sliding groove for preventing the charger from toppling down.

9. The charger as claimed in claim 8, wherein each of the sliding elements has a bottom board, an outer board and an inner board respectively perpendicularly extending upward from two opposite sides of the bottom board, a first connecting board obliquely extending away from the outer board from a free end of the inner board, and a top board perpendicularly extending towards the inner board from an upper end of the outer board.

10. The charger as claimed in claim 9, wherein the middle of an inner side of the outer board perpendicularly extending toward the first connecting board to form a sliding board which connects an upper end of the first connecting board, two opposite sides of the sliding groove respectively defines a sliding track, two opposite outer sides of the sliding board are respectively slidably received in the sliding track.

* * * * *